United States Patent [19]

Dea et al.

[11] 4,145,454

[45] Mar. 20, 1979

[54] STABILIZED SPOONABLE ICE CREAM

[75] Inventors: Iain C. M. Dea, Bedford; David J. Finney, Letchworth, both of England

[73] Assignee: Thomas J. Lipton, Inc., Englewood Cliffs, N.J.

[21] Appl. No.: 839,637

[22] Filed: Oct. 5, 1977

[30] Foreign Application Priority Data

Oct. 6, 1976 [GB] United Kingdom ............... 41602/76
May 25, 1977 [GB] United Kingdom ............... 22069/77
May 27, 1977 [GB] United Kingdom ............... 22532/77

[51] Int. Cl.² ............................................. A23G 9/02
[52] U.S. Cl. ................................... 426/565; 426/654
[58] Field of Search ............... 426/565, 566, 567, 654

[56] References Cited

U.S. PATENT DOCUMENTS

| 3,343,966 | 9/1967 | Lowenstein | 426/567 |
| 3,845,223 | 10/1974 | Moneymaker | 426/566 |
| 3,968,266 | 7/1976 | Baugher | 426/566 |
| 3,993,793 | 11/1976 | Finney | 426/565 |
| 3,996,389 | 12/1976 | Osborne | 426/565 |

*Primary Examiner*—Jeanette M. Hunter
*Attorney, Agent, or Firm*—Brumbaugh, Graves, Donohue & Raymond

[57] ABSTRACT

The properties of ice creams scoopable at deep-freeze temperatures are improved by incorporating stabilizer mixtures comprising (a) locust bean gum and/or tara gum and (b) kappa-carrageenan and/or xanthan gum and/or agar-agar.

8 Claims, No Drawings

STABILIZED SPOONABLE ICE CREAM

The invention relates to stabilised ice cream, to a process for preparing stabilised ice cream and to stabilizer systems, for use, for instance, in ice cream.

The way in which ice cream behaves on exposure to normal room temperature is important for the consumer. If a product behaves too atypically, for instance if a product melts too rapidly or separates into a fatty phase and a clear aqueous phase on melting, then the product will be unacceptable. In the ice cream industry methods have been developed for measuring such properties, for instance melt-down and stand-up. These are described later.

It is known that such properties can be affected by the use of stabilizers, often called thickeners. A problem that arises is that the stabilizer deleteriously affects the feel of the ice cream in the mouth; a cloying, gummy or even greasy feel can occur. This problem is acute in ice creams that require more than usual stabilization. What is desired is a stabilizer system that is good or at least adequate with respect to all aspects of stability. This is difficult to achieve for normal ice creams and particularly so for ice creams that require more than usual stabilization.

A problem with conventional ice creams is that at deep freeze temperatures, eg −20° C., they cannot be served or eaten as readily as when they are at normal eating temperatures, eg −10° C. The consumer cannot treat them even approximately in the normal manner immediately when taken from the deep freeze. In some cases conventional ice creams cannot even be scooped out with a spoon at −20° C., ie are not spoonable. Reformulation to ensure that such properties, eg spoonability at deep freeze temperatures, are approximately those expected at normal eating temperatures is comparatively simple. Methods are outlined later. The difficulty is that such reformulation leads to products that do not have acceptable properties, in particular stability, at normal eating temperatures. It has seemed impossible to get an ice cream that has at both deep-freeze and normal eating temperatures even approximately the serving and eating properties conventionally expected at normal eating temperatures and that is sufficiently stable. In particular it is difficult to get adequate stability without the ice cream having unacceptably cloying mouth-feel. The present invention provides stabilizer systems with which this can be achieved.

For an ice cream to be spoonable at −20° C. its log C (C is its penetrometer value — for measurement see later) should preferably be less than 2.8, particularly preferably less than 2.5; a correlation exists between spoonability and log C.

The invention therefore provides an ice cream stabilized with a stabilizer mixture comprising locust bean gum and/or tara gum with other stabilizers and prepared by aerating and freezing and then hardening to a temperature below −20° C. an ice cream mix containing the stabilizer mixture characterised in that the ice cream is an ice cream that, after it has been hardened, has a log C at −20° C. of less than 2.8 and the stabilizer mixture comprises (a) locust bean gum and/or tara gum and (b) xanthan gum and/or agar-agar and/or kappa-carrageenan. As general guidance to achieve a stabilized ice cream with desired log Cs at −20° C. the following limits apply; in exceptional circumstances stabilized ice creams with the required loc C at −20° C. can be achieved outside these limits. The general limits are that the amount of (a) should be greater than 0.07% by weight of the ice cream mix, the amount of (b) should be greater than 0.02% by weight of the ice cream mix and the amount of total stabilizers should be such that the viscosity of the mix prior to aerating and freezing is not greater than 4 poise at 20 reciprocal seconds at 5° C. Use of ice cream mixes with viscosities over 4 poise lends to problems in processing and in mouth-feel of the hardened ice cream.

Another stabilizer system for such ice creams is described in German specification 25 25 299. As explained there it will be appreciated that the product-characteristics required for a conventional ice cream will depend on the personal tastes of the consumer and ice creams are formulated to meet a variety of such tastes; the formulation of any one conventional ice cream will depend on the tastes of the consumers concerned. (In this context a conventional ice cream is one prepared by a process involving freezing and hardening to a temperature below −20° C., usually in the order of −20° C. to −40° C.) One important characteristic of ice cream particularly in relation to scoopability is the log C, as defined later, of the ice cream. In the UK for instance, an ice cream can normally only be called a conventional ice cream if its log C at −20° C. after hardening is in the range 2.9 to 3.7; for example in the UK usually the log C of a non-dairy ice cream at −20° C. after hardening will be in the range 3.3 to 3.7 and for a dairy ice cream the range is 2.9 to 3.3. In other countries values for log C will be comparable but can be different, often higher, and indeed even within a country various conventional ice creams will vary in their log C values.

Whatever the conventional ice cream used, its properties at deep-freeze temperatures can be approximated to those expected at normal eating temperature by adding freezing-point depressants such as monosaccharides and low molecular-weight alcohols, preferably polyalcohols and in particular glycerol and sorbitol. Normally sufficient of such freezing-point depressants should be added to the formulation of a conventional ice cream, eg at expense of water, to lower the log C at −20° C. by between 0.25 and 1, preferably by 0.4 to 0.75. The notional replacement, eg of freezing point depressants for sugar (sucrose)/water, should be such that the product has the desired (by the consumer) sweetness as well as the desired log C, or spoonability, at −20° C.

A particularly surprising aspect of the invention is the achievement, by use of the claimed stabilizer mixture, of an ice cream formulated to have a log C at −20° C. of less than 2.8 but with comparable serving and eating characteristics at normal eating temperatures to ice cream similarly formulated except that its content of freezing-point depressants is such that its log C at −20° C. is between 0.25 and 1 higher than that of the ice cream formulated to have a log C at −20° C. of less than 2.8.

The log C at −20° C. of an ice cream according to the invention should preferably not be less than 2.3.

A further advantage of the claimed use of particular stabilizer mixtures is that in the stabilized ice cream obtained the undue growth of ice crystals is prevented and the presence of unduly large ice crystals is masked; organoleptically detectable ice crystals in an ice cream can make the ice cream unacceptable to the consumer.

In its process aspect the invention provides a process in which freezing-point depressants and stabilizers comprising locust bean gum and/or tara gum with other stabilizers are incorporated in an ice cream mix, the mix is aerated and frozen and than hardened at a temperature below −20° C. characterised in that the freezing-point depressants are such that, after hardening, the ice cream has a log C at −20° C. of less than 2.8 and the stabilizers in the ice cream mix comprise (a) locust bean gum and/or tara gum and (b) xanthan gum and/or agar-agar and/or kappa-carrageenan. As explained in describing the product aspect of the invention the general limits are that the amount of (a) should be greater than 0.07% of the ice cream mix, the amount of (b) should be greater than 0.02% of the mix and the amount of total stabilizers in the mix should be such that the viscosity of the mix prior to aerating and freezing is not greater than 4 poise at 20 reciprocal seconds at 5° C.

The stabilizer system will now be described further.

Although as (a) a mixture of locust bean gum and tara gum can be used, locust bean gum is preferred.

Locust bean gum, galactans such as kappa-carrageenan xanthan gum and agar-agar are well-known and are for instance described in Glicksman, Gum Technology in the Food Industry, Food Science and Technology, New York and London, 1969.

Other stabilizers such as guar gum and carboxymethyl cellulose can be present but, as implied above, preferably not in amounts such that the viscosity of the ice cream mix is more than 4 poise reciprocal seconds at 5° C.

Replacement of up to 50%, by weight, of (a) by guar gum can occur provided the total remaining (a) is greater than 0.7% by weight of the ice cream mix. Such replacement gives a creamier mouth-feel and improves the resistance of the hardened ice cream to temperature cycling. The amount of (a) should generally be greater than 0.07% by weight of the ice cream to ensure preferred melt-down and stand-up characteristics.

Substances such as low-DE maltodextrins and modified starches can be added to improve mouth-feel, although preferably not in amounts such that the viscosity of the ice cream mix is more than 4 poise reciprocal seconds at 5° C. Thus low-DE (dextrose equivalent) maltodextrin can advantageously be present to improve the mouth-feel. By low DE is meant a maltodextrin with a DE of less than 20. The maltodextrin should be soluble. The lower limit for DE at which maltodextrins become insoluble depends particularly on the other ingredients in an ice cream mix but whether a given maltodextrin is soluble in any such mix can be determined readily by experiment and in particular by noting whether it leads to the desired effect.

Maltodextrins can for example be obtained by the mild hydrolysis of starch. Enzymatic hydrolysis, optionally under acidic conditions, of the starch can be used; the conditions are so mild that negligible repolymerisation occurs. This is in contrast to dextrins which typically are made from starch by hydrolysis and repolymerisation using high temperature and pressure.

It has further been found that starches, in particular modified starches such as the modified starch sold by Laing National under the trade name "Instant Cleargel" and believed to be adipate/acetate modified waxy maize starch, can usefully be incorporated to improve the mouth-feel. The amount of the modified starch should preferably be, by weight of the ice cream, in the range 0.05 to 0.4%, most preferably in the range 0.05 to 0.2%.

At least for simplicity simple combinations of (a) and (b) are preferred. For this reason use of agar-agar as (b) is a preferred form of the invention. When (b) is agar-agar, the amount of agar-agar should, in an ice cream, preferably be from 0.05% to 0.15 by weight; the amount of (a) should preferably be from 0.1% to 0.20% and the weight ratio of agar-agar to (a) should preferably be in the range 1:1 to 1:3. The total amount of (b) and (a) and the ratio of (b) to (a) depend to some extent on other ingredients present but the above is a useful general rule when (b) is agar-agar. The total amount of (a) and (b) is preferably, when (b) is agar-agar, in the range 0.15 to 1.0%, particularly preferably 0.25 to 0.5%.

Because of the particularly good properties, eg stability, which are obtained, (b) is preferably xanthan gum. When (b) is xanthan gum the weight ratio of (a) to (b) is preferably 7:1 to 1:7 particularly preferably 4:1 to 1:2, when (a) is locust bean gum, and preferably 7:1 to 1:2 particularly preferably 4:1 to 1:1, when (a) is tara gum. With a low excess of (a) to (b), ie weight ratio 4:1 to 1:1, aeration of the ice cream and the texture of the ice cream are particularly good. Total (a) plus (b) is preferably in the range 0.15 to 1% particularly preferably 0.25 to 0.5%. Preferably the amount of (a) is at least 0.1% and is less than 0.4%. Preferably the amount of xanthan gum is at least 0.05%.

Xanthan gums are well-known and are for instance described by Glicksman, Gum Technology in the Food Industry, Food Science and Technology, New York and London, 1969, pages 341–347. A preferred type is described by Glicksman at page 346 as being "a polysaccharide gum derived from Xanthamonas campestris by a pure-culture fermentation process and purified by recovery eg with isopropyl alcohol. It contains D-glucose, D-mannose and D-glucuronic acid as the dominant hexose units and is manufactured as the sodium, potassium or calcium salt."

Use of kappa-carrageenan as (b) also is a preferred form of the invention; improved properties, in particular stability, are obtained. When (b) is kappa-carrageenan, the weight ratio of (a) to (b) is preferably in the range 1:1 to 7:1. The total of (a) and (b) is preferably in the range 0.15 to 1%, particularly preferably 0.15 to 0.5%. The ratio of (a) to (b) is particularly preferably in the range 3:1 to 7:1. The amount of (a) is preferably greater than 0.1%.

Carrageenans are sulphated galactans. Carrageenans are of at least three types: iota-carrageenan, kappa-carrageenan and lambda-carrageenan. Furcellaran is a closely related polysaccharide and like carrageenan is a sulphated galactan. Sulphated galactans can occur within the range of properties exhibited by ideal furcellaran and ideal iota-carrageenan. Kappa-carrageenan is intermediate between furcellaran and iota-carrageenan in structure and in its ability to interact with locust bean gum. All are polymers based on a disaccharide moeity containing D-galactose and anhydro-D-galactose.

In ideal kappa-carrageenan all the galactoses are substituted with four sulphate groups. In ideal iota-carrageenan all the galactoses are substituted with four sulphate groups and all the anhydrogalactoses are substituted with two sulphate groups. In a typical furcellaran half the galactoses can be considered to be substituted with four sulphate groups. Sulphated galactans occur within the full range from furcellaran to ideal iota-carrageenan i.e. they range in extent to which the galactoses are substituted with four sulphate groups and in the extent to which the anhydrogalactoses are substituted with two sulphate groups. (Note lambda-carrageenan does not come within the range from furcellaran to iota-carrageenan).

For the purposes of the present invention all galactans within the range from furcellaran towards iota-carrageenan can be treated as equivalents to kappa-carrageenan to the extent that they interact with locust bean gum e.g. a galactan that interacts to half the extent with locust bean gum as does kappa-carrageenan is only equivalent to half its weight of kappa-carrageenan. (Molecular weight and interaction with protein are also factors that have to be taken into account.) Actual kappa-carrageenans, i.e. sulphated galactans approximating to ideal kappa-carrageenan and normally classified as kappa-carrageenans, are preferred. The percentage and ratio limits recommended when (b) is kappa-carrageenan are based on work using actual kappa-carrageenan.

Chrondrus crispus produces carrageenan of this type. Eucheuma cottonii also produces kappa-carrageenan and carrageenan from this source is also preferred for use in the practice of this invention. Other sea plants from which kappa carrageenan is obtainable are Gigartina stellata, Gigartina pistillata, Gigartina canaliculata, Gigartina chamissoi, Eucheuma edule and Eucheuma okamura.

It is particular advantage of the invention that, at lease where (b) is xanthan gum or kappa-carrageenan or a galactan of the equivalent to kappa-carrageenan, stable hardened dairy ice creams can be prepared with a log C at −20° C. less than 2.8.

A particular aspect of the invention is the use of stabilizer combinations in which (b) is more than one of agar-agar, xanthan gum and kappa-carrageenan.

Other than in the use of sufficient freezing point depressant for the preferred aspect of the invention and in the use of stabilizers comprising particular components in particular ways no especial insight is required in the formulation or processing of ice creams according to the invention. Details of conventional formulations and processing conditions for ice cream can be found in the usual trade publications and text books. Particularly useful in this respect is Arbuckle, "Ice Cream," 1972 (2nd Edition), AVI Publishing Corp., Westpoint, Conn. Typical ice cream mixes contain milk solids, sugars, fat (dairy or non-dairy), emulsifiers, stabilizers, colour and flavour.

The properties of the ice creams of the invention obtained using the particular stabilizers are surpisingly better than the properties of ice creams obtained using optimum quantities of the separate stabilizers.

To obtain the desired, stabilized ice cream normally (a) and (b) should not both be, at the same time, at or near their lower limits.

In this specification ratios are by weight and percentages are by weight and in particular are by weight of ice cream mix except where the context requires otherwise. The invention will be illustrated further by the following examples.

Examples 1 and 2 give ice cream mixes that with conventional processing provide excellent ice creams scoopable at −20° C.

EXAMPLE 1

| Ingredient | % by weight |
|---|---|
| Made-up skimmed milk (32.5% solids) | 27 |
| Sucrose | 13 |
| Glucose syrup | 2 |
| Liquid oil blend | 9.5 |
| Monoglyceride emulsifier | 0.45 |
| Colour and flavour | 0.03 |
| Salt | 0.05 |

-continued

| Ingredient | % by weight |
|---|---|
| Glycerol | 3.0 |
| Stabilizers[1] | 0.25 |
| Water to | 100 |

[1]LBG and kappa-carrageenan in ratio 4:1

EXAMPLE 2

(A standard non-dairy ice cream differs from this formulation in containing no glycerol and 1.4% by weight more sugar, 3% glycerol is roughly equivalent in sweetness to 1.5% sucrose.)

| Ingredient | % by weight |
|---|---|
| Spray dried milk powder | 9.5 |
| Sucrose | 13.5 |
| Maltodextrin 40 DE* (Glucose syrup) | 1.7 |
| Palm oil | 9.5 |
| Monoglyceride from palm oil | 0.5 |
| Glycerol | 3.0 |
| Salt | 0.05 |
| Flavour and colour | 0.1 |
| Stabilisers[1] | 0.25 |
| Water to | 100 |

*DE = dextrose equivalent
[1]As in Example 1

EXAMPLE 3

| Ingredient | % by weight |
|---|---|
| Made-up skimmed milk (32.5% solids) | 30 |
| Sucrose (as liquid syrup) | 25 ( = 15% solids plus 10% water) |
| Stabilizers: | |
|   Locust Bean Gum | 0.2 |
|   Kappa-Carrageenan | 0.03 |
| Butter oil | 6 (equiv. to 7.5% butter) |
| Glycerol | 2 |
| Emulsifier: | |
|   Palm mono-glycerides | 0.5 |
| Flavour and colour | 0.04 |
| Water to | 100 |

EXAMPLES 4–16 AND COMPARISONS X, Y AND Z

Ice creams were prepared to the formulation given in Example 3 except that, instead of the stabilizers indicated in Example 3, the stabilizers and mouth-feel aids shown in the following Table I were used. The Table shows the results obtained, including the results for Example 3.

EXAMPLE 17

An ice cream was prepared by conventional processing techniques to the following formulation:

| Ingredient | % by weight |
|---|---|
| Skimmed Milk Powder | 12.0 |
| Sugar | 10.0 |
| Sorbitol | 3.0 |
| Dextrose (monohydrate) | 3.0 |
| Butter | 12.0 |
| Mono/Di-glyceride emulsifier | 0.3 |
| Agar-agar | 0.1 |
| Locust Bean Gum | 0.15 |
| 17 DE Maltodextrin | 2.0 |
| Water to | 100.0 |

An ice cream was obtained that was scoopable at domestic deep freeze temperature and yet had excellent stand-up, melt-down, taste and texture at normal eating temperature.

EXAMPLES 18 TO 24 AND COMPARISONS A TO D

Ice cream mixes were prepared conventionally to the following formulation. Further details are given in the following Table II which also shows results obtained with ice cream prepared conventionally from the mixtures. A standard non-dairy ice cream differs from this formulation in containing no glyerol and 1.4% by weight more sucrose. 3% glycerol is roughly equivalent in sweetness to 1.5% sucrose.

| | |
|---|---|
| Spray dried milk powder | 9.5 |
| Sucrose | 13.5 |
| Maltodextrin 40 DE (Glucose syrup) | 1.7 |
| Palm oil | 9.5 |
| Monoglyceride from palm oil | 0.5 |
| Glycerol | 3.0 |
| Salt | 0.05 |
| Flavour and colour | 0.1 |
| Stabilizers | Table |
| Water    to | 100 |

The log C of the standard ice cream mentioned above was in the range 3.2 to 3.3.

EXAMPLE 25

| Ingredient | % by weight |
|---|---|
| Made-up skimmed milk (32.5% solids) | 30 |
| Sucrose (as liquid syrup) | 25 ( = 15% solids plus 10% water) |
| Stabilizers: | |
|    Locust Bean Gum | 0.1 |
|    Xanthan Gum | 0.2 |
| Butter oil | 6 (equiv to 7.5% butter) |
| Glycerol | 2 |
| Emulsifier: | |
|    Palm mono-glycerides | 0.5 |
| Flavour and colour | 0.04 |
| Water    to | 100 |

The ice cream prepared to this formulation using conventional processing techniques was spoonable at −20 C, had excellent eating properties and good physical properties when tested for melt-down, shape-retention and physical stability as described below.

EXAMPLES 26 TO 35 AND COMPARISONS E TO L

Table III gives results obtained with ice cream mixes processed and formulated as in Example 25 except that the stabilizers given in Table III were used instead of the 0.1% locust bean gum and 0.2% xanthan gum used in Example 25.

In Table III, A is xanthan gum, B is locust bean gum, C is guar gum, D is tara gum and * indicates that 2% 17-DE maltodextrin was also present.

The long C values at −20 C of all the Examples (1 to 35) were in the range 2.5 and 2.8.

Test methods

Melt-Down Test and Shape Retention

A rectangular block of ice cream of length 13.6 cm, height 4.0 cm and width about 8.8 cm which has been stored at −20 C is placed on a wire gauze (10 wires per inch) in an atmosphere maintained at 15 C. Arrangements are made for collection of the liquid drained from the gauze. The time for the collection of the first 10 ml of liquid is noted. The volume of liquid collected in each subsequent 10 minute period is measured and the slope of the graph obtained by plotting volume collected against time is taken as the melt-down (mls/hr). After 4 hours thawing photographs of the residue of the brick are taken, and the degree of shape retention assessed as bad, poor, fair, good or very good.

For dairy ice creams i.e. where the fat is butter fat preferred products according to the invention have melt-downs of less than 40 ml/hr and particularly preferably of between 5 and 25 ml/hr. For ice creams based on vegetable fat preferred products according to the invention have melt-downs of less than 25 ml/hr and particularly preferably of between 5 and 20 ml/hr.

Stability to Temperature Cycling

This is a further test that distinguishes between ice creams with respect to their stability. Ice creams according to the present invention give good results. The test is carried out on an approximately cuboid half-gallon block of ice cream in a plastic container. Typical storage regime follows:

I. (Used for the tests reported in Table II.)

After storage in a deep-freeze (−20 C) it is transferred to ambient (20 C) for 1 hour and then to a refrigerator at −10 C. Next day the block is subjected to further temperature shock cycling by being taken out of the refrigerator and left at ambient for half an hour. This (each day half an hour at ambient) is repeated to a total of six times and then the block is returned to the deep-freeze (−20 C) for assessment the next day. The total test takes, allowing for a weekend, not more than ten days.

II (Used for the tests reported in Tables I and III. After storage in a deep-freeze at −20 C it is transferred to ambient (20 C) for 2 hrs and then to a deep-freeze at −15 C. Next day the block is subjected to further temperature shock cycling by being taken out of the deep-freeze and left at ambient for 1 hour and then returned to deep-freeze at −20 C. Next day the sample is left at ambient for half an hour and returned to deep-freeze at −20 C. This (each day half an hour ambient) is repeated five more times and then the block is returned to the deep-freeze at −20 C for assessment the next day. The total test takes, allowing for a weekend, not more than ten days.

Product stability is assessed as follows:
Bad: total breakdown
Poor: more than 20% of product converted to serum
Fair: 5–20% of product converted to serum
Good: less than 5% of product converted to serum

C and Log C

To determine C and hence log C the following method is used.

Principle

The hardness of ice cream is measured by allowing a standard cone to penetrate a sample for 15 seconds using a cone penetrometer. The C-value can be calculated from the penetration depth.

Tempering facilities (a) Room controlled at required temperature, tolerance 1 C;

(b) Constant-temperature cabinets, tolerance 0.2 C. The forced-draught constant-temperature cabinets supplied by Zero N.V. Rotterdam are satisfactory.
Process:

Sampling

Samples should be convenient size and preferably with smooth surfaces to increase accuracy.

Tempering

2 Days at whatever temperature is required e.g. −20 C. Measure temperature accurately before penetration.
Apparatus:

Ebonite cone

With an apex angle of 40 degrees and the tip blunted by a few strokes on fine abrasive paper to give a flat 0.3 mm plus or minus 0.03 mm in diameter. Total weight of cone and sliding penetrometer shaft 80g plus or minus 0.3 g.; also additional weights of 80g plus or minus 0.3g.

Penetrometer

This should have a scale calibrated in 0.1mm., and fitted with a lens. The penetrometer made by Sommer and Runge, Berlin, is recommended, particularly for static use. The Hutchinson instrument can also be used; it requires no electricity supply, but must be modified for satisfactory operation. The accuracy of penetrometer timing mechanisms must be checked regularly. The use of a three times magnification lens of about 6–8 cm. diameter fitted to the penetrometer facilitates the setting of the cone tip on the sample surface, and an unfocused light limited to the equivalent of a 1-watt bulb at a distance of about 5 cm. (to avoid heating the sample surface) is also advantageous.

Temperature probe

The temperature probe should read to within 0.1 C and have a stem about 1 mm. in diameter and about 4 cm. long. Its accuracy should be checked regularly in baths of known temperatures.

Measurement

Where possible, penetrations are made in the temperature-controlled room, and should be completed within two minutes of removing the sample from the constant temperature cabinet.

1. Insert the temperature probe as near horizontally as possible at a few mm. below the sample surface, read and note the sample temperature after 30 seconds. (Reject any samples differing by more than 0.5 C from the nominal test temperature.)
2. Place the samples on the levelled penetrometer table.
3. Set the cone tip accurately on the sample surface, using a lens and, if necessary, oblique lighting.
4. Release the arresting device and allow the cone to penetrate the sample for 15 seconds.
5. Read and note the penetration depth.
6. Should the penetration depth be less than 72 × 0.1 mm. (equivalent to a C-value of more than 500 g./cm. squared) the measurement should be repeated with the cone weight increased by 80 g.
   Further 80 g. weights may be added as necessary to ensure adequate penetration of the sample and the C-value scale reading corrected accordingly.
7. Penetration measurements should not be made within 2 cm. of the sample edge nor within 2.5 cm. of each other. Determinations in which air bubbles, cracks, etc. interfere should be rejected.

Calculation of C-values

The C-value can be calculated from the penetration depth using the formula:

$$C = (K \times F/1.6)$$

where
$C$ = Yield value or C-value (g./cm. squared)
$F$ = Total weight of cone and sliding stem (g.)*
$P$ = Penetration depth (0.1 mm.)
$K$ = Factor depending on cone angle:

| Cone Angle | K Value |
| --- | --- |
| 40 | 5840 |

*Depending on the likely softness of the product, the cone weight should be adjusted, eg.
at −10 C    use 80 gm
at −15 C    use 160 gm
at −20 C    use 240 gm
ie it depends on temperature of measurement.

C values are taken after hardening conventionally, as for instance described above and in the standard textbooks.

Table I

| Examples 4–10 Comparisons X,Y & Z | A | B | C | D | E | F | G | Viscosities poise² | Ratio¹ | Over-run (%) | Meltdown for 4 hrs at +15° C. 1st 10 ml (mins) | Rate (mls/hr) | Total Drip (mls) | Shape Retention | Stability | Overall Acceptability |
| --- | --- | --- | --- | --- | --- | --- | --- | --- | --- | --- | --- | --- | --- | --- | --- | --- |
| X | .2 | | | .01 | .1 | | | 1 | 20:1 | 108 | 92 | 25 | 72 | Fair | Poor | Not Acceptable |
| 3 | .2 | | | .03 | | | | 1.6 | 7:1 | 103 | 132 | 20 | 46 | Good | Fair | Acceptable |
| 4 | .2 | | | .03 | .1 | | | 1.7 | 7:1 | 113 | 102 | 26 | 70 | Fair | Fair | Acceptable |
| 5 | .2 | | | .03 | .2 | | | 1.8 | 7:1 | 106 | 105 | 22 | 61 | Fair | Fair | Acceptable |
| 6 | .2 | | | .05 | | | | 2.0 | 4:1 | 94 | 94 | 21 | 61 | Fair | Fair | Acceptable |
| 7 | .2 | | | .05 | .1 | | | 2.1 | 4:1 | 119 | 98 | 41 | 107 | Fair | Fair | Acceptable |
| 8 | .2 | | | .05 | .2 | | | 2.3 | 4:1 | 97 | 95 | 22 | 62 | Fair | Q. Good³ | Good |
| 9 | .2 | | | .07 | .1 | | | 3.1 | 3:1 | 98 | 118 | 26 | 63 | Fair | Good | Good |
| 10 | .1 | | | .03 | .1 | | | 0.8 | 3:1 | 107 | 70 | 23 | 77 | Fair | Fair | Acceptable |
| 11 | .25 | | | .03 | .1 | | | 2.5 | 8:1 | 97 | 120 | 24 | 56 | Q.Good | Fair | Good |
| 12 | .2 | | | .03 | | | 2.0 | 1.6 | 7:1 | 102 | 96 | 23 | 66 | Q.Good | Fair | Good |
| 13 | .2 | | | .05 | | | 2.0 | 2.0 | 4:1 | 95 | 104 | 23 | 62 | Fair | Fair | Good |
| 14 | .2 | | | | .05 | .1 | | 2.4 | 4:1 | 106 | 104 | 24 | 65 | Fair | Q.Good | Good |
| 15 | .2 | | | | .05 | | 2.0 | 2.1 | 4:1 | 103 | 84 | 34 | 99 | Fair | Fair | Acceptable |
| Y | | .2 | | .03 | .1 | | | 1.7 | 7:1 | 115 | 92 | 155 | 395 | Poor | Good | Not Acceptable |
| Z | | .2 | | .05 | .1 | | | 2.2 | 4:1 | 106 | 75 | 155 | 437 | Poor | Fair | Not Acceptable |

Table I-continued

| Examples 4–10 Comparisons X,Y & Z | A | B | C | D | E | F | G | Viscosities poise[2] | Ratio[1] | Overrun (%) | Meltdown for 4 hrs at +15° C. 1st 10 ml (mins) | Rate (mls/hr) | Total Drip (mls) | Shape Retention | Stability | Overall Acceptability |
|---|---|---|---|---|---|---|---|---|---|---|---|---|---|---|---|---|
| 16 | | | | .2 | .03 | | .1 | 1.8 | 7:1 | 93 | 102 | 20 | 57 | Fair | Good | Good |

A : LBG
B : Guar gum
C : Tara gum
D : Carragel MS 20
E : Genulacta L-100
F : Instant Cleargel
G : Low-DE Maltodextrin D and E both are kappa-carrageenan. F and G are mouth-feel aids rather than stabilizers
[1] Ratio of galactomannan gums (A–C) to kappa-carrageenan (D–E)
[2] at 20 sec$^{-1}$ at 5° C.
[3] Quite good Table II

| Example or Comparison | % by weight LBG | Agar-Agar | Low-DE Maltodextrin | Mix Viscosity (cps) | Overrun % | Meltdown at 15° C. 1st 10 ml (mins) | Rate (mls/hr) | Shape Retention | Stability Cycling |
|---|---|---|---|---|---|---|---|---|---|
| A | | 0.1 | | 42 | 64 | 100 | 28 | Poor | Poor |
| B | 0.175 | | | 44 | 85 | 80 | 26 | Poor | Poor |
| C | | | 2(17-DE)[1] | 17 | 52 | 50 | 136 | Bad | Bad |
| D | 0.175 | | 2(17-DE) | 58 | 110 | 110 | 13 | Fair | Poor |
| 18 | 0.175 | 0.1 | 2(17-DE) | 79 | 115 | 126 | 8 | Good | Fair |
| 19 | 0.175 | 0.1 | | 79 | 115 | 126 | 9 | Good | Fair |
| 20 | 0.175 | 0.05 | 2(17-DE) | 49 | 121 | 125 | 9 | Fair | Fair |
| 21 | 0.1 | 0.1 | 2(17-DE) | 44 | 123 | 115 | 9 | Fair | Fair |
| 22 | 0.175 | 0.1 | 1(17-DE) | 66 | 118 | 127 | 7 | Good | Fair |
| 23 | 0.175 | 0.1 | 2(12-DE) | 57 | 118 | 135 | 9 | Fair | Good |
| 24 | 0.175 | 0.15 | 2(17-DE) | 59 | 105 | 140 | 8 | Good | Fair |

[1] 2% of 17-DE maltodextrin

Table III

| Example (Comparison) | Stabilizers (% by Wt.) A | B | C | D | Ratio of (a) to (b) | Mix Viscosity (cps) | Overrun (%) | 'Churned' Fat (%) | Meltdown at +15° C. 1st 10 mls (mins) | Rate (mls/hr) | Total Drip (mls) | Shape Retention | Stability to Temperature Cycling | Organoleptic Acceptability | Overall Acceptability |
|---|---|---|---|---|---|---|---|---|---|---|---|---|---|---|---|
| (E) | .2 | | | | ∞ | 157 | 122 | 13 | 47 | 148 | 487 | Bad | Fair | Acceptable | Not Acceptable |
| (F) | .2 | .15 | | | 3:4 | 471 | 86 | 42 | 180 | 11 | 21 | Good | Fair | Un-Acceptable | Not Acceptable |
| 26 | .16 | .12 | | | 3:4 | 400 | 72 | 45 | 91 | 18 | 54 | Fair | Fair | Just Acceptable | Acceptable |
| (G) | .2 | .2 | | | 1:1 | 830 | 96 | 34 | 116 | 7 | 25 | Good | Good | Un-Acceptable | Not Acceptable |
| 27 | .1 | .1 | | | 1:1 | 137 | 108 | 28 | 106 | 20 | 54 | Fair | Fair | Acceptable | Acceptable |
| 28 | .12 | .16 | | | 4:3 | 322 | 102 | 23 | 92 | 9 | 35 | Fair | Fair | Acceptable | Acceptable |
| (H) | .15 | .2 | | | 4:3 | 450 | 106 | 23 | 136 | 6 | 21 | Good | Good | Un-Acceptable | Not Acceptable |
| 29 | .1 | .2 | | | 2:1 | 379 | 98 | 28 | 99 | 9 | 31 | Fair | Good | Acceptable | Acceptable |
| 30* | .1 | .2 | | | 2:1 | 385 | 113 | 35 | 124 | 8 | 26 | Fair | Good | Acceptable | Acceptable |
| 31 | .05 | .2 | | | 4:1 | 226 | 110 | 24 | 77 | 24 | 76 | Fair | Fair | Acceptable | Acceptable |
| 32 | .03 | .2 | | | 7:1 | 175 | 103 | 21 | 81 | 26 | 80 | Fair | Fair | Acceptable | Just Acceptable |
| (I) | | .2 | | | ∞ | 126 | 114 | 20 | 69 | 28 | 90 | Fair | Poor | Acceptable | Not Acceptable |
| 33 | .05 | | | .2 | 4:1 | 190 | 105 | | 81 | 18 | 58 | Fair | | Acceptable | Acceptable |
| 34 | .1 | | | .2 | 2:1 | 291 | 107 | | 127 | 10 | 28 | Fair | | Acceptable | Acceptable |
| 35 | .2 | | .1 | | 1:2 | 387 | 105 | 20 | 120 | 109 | 227 | Poor | Good | Acceptable | Just Acceptable |
| (J) | .2 | .1 | | | | 226 | 95 | 13 | 43 | 138 | 463 | Bad | Fair | Acceptable | Not Acceptable |
| (K) | .05 | .2 | | | | 145 | 124 | 14 | 67 | 96 | 255 | Poor | | Acceptable | Not Acceptable |
| (L) | | .2 | | | | 86 | 111 | 13 | 61 | 196 | 399 | Bad | | Acceptable | Not Acceptable |

What we claimed is:

1. A hardened ice cream containing sufficient freezing point depressants that its log C at −20° C. is less than 2.8 and stabilised with (a) at least one stabilizer selected from the group consisting of locust bean gum and tara gum and (b) at least one stabilizer selected from the group consisting of xanthan gum, agar-agar and kappa-carrageenan.

2. A hardened ice cream as claimed in claim 1 in which up to 50%, by weight of (a) is replaced by guar gum and the total remaining (a) is greater than 0.07% by weight of the ice cream.

3. A hardened ice cream as claimed in claim 1 in which (b) is agar-agar.

4. A hardened ice cream as claimed in claim 1 in which (b) is xanthan gum.

5. A hardened ice cream as claimed in claim 1 in which (b) is kappa-carrageenan.

6. A hardened ice cream as claimed in claim 1 in which (b) is a mixture comprising at least two stabilizers selected from the group consisting of agar-agar, xanthan gum and kappa-carrageenan.

7. A process for preparing a hardened ice cream in which freezing-point depressants and stabilisers are incorporated in an ice cream mix, the mix is aerated and frozen and then hardened at a temperature below −20° C. in which the stabilisers comprise (a) at least one stabilizer selected from the group consisting of locust bean gum and tara gum and (b) at least one stabilizer selected from the group consisting of xanthan gum, agar-agar, kappa-carrageenan and a galactan equivalent to kappa-carrageenan.

8. A process as claimed in claim 7 in which the amount of stabilisers in the mix is such that the viscosity of the mix prior to aerating and freezing is not greater than 4 poise at 20 seconds$^{-1}$ at 5° C.

* * * * *